United States Patent
Tsuru et al.

(10) Patent No.: US 6,979,365 B2
(45) Date of Patent: Dec. 27, 2005

(54) INK SET

(75) Inventors: Isao Tsuru, Wakayama (JP); Takehiro Tsutsumi, Wakayama (JP)

(73) Assignee: Kao Corporation, Tokyo (JP)

(*) Notice: Subject to any disclaimer, the term of this patent is extended or adjusted under 35 U.S.C. 154(b) by 8 days.

(21) Appl. No.: 10/793,264

(22) Filed: Mar. 5, 2004

(65) Prior Publication Data
US 2004/0173120 A1 Sep. 9, 2004

(30) Foreign Application Priority Data
Mar. 6, 2003 (JP) .................... 2003-060292

(51) Int. Cl.⁷ ................................ C09D 11/02
(52) U.S. Cl. .................................... 106/31.6
(58) Field of Search .................. 106/31.6, 31.27

(56) References Cited

U.S. PATENT DOCUMENTS

| | | | |
|---|---|---|---|
| 5,198,023 A | 3/1993 | Stoffel | |
| 5,700,317 A | 12/1997 | Adamic | |
| 5,835,116 A | 11/1998 | Sato et al. | |
| 6,022,908 A * | 2/2000 | Ma et al. | 523/160 |
| 6,036,759 A | 3/2000 | Wickramanayake et al. | |
| 6,342,095 B1 | 1/2002 | Takizawa et al. | |
| 6,521,323 B1 | 2/2003 | Sakaki et al. | |
| 6,585,815 B2 * | 7/2003 | Koitabashi et al. | 106/31.27 |
| 6,706,105 B2 * | 3/2004 | Takada et al. | 106/31.6 |
| 6,790,878 B2 * | 9/2004 | Kurabayashi | 523/160 |
| 2004/0129171 A1 * | 7/2004 | Wickramanayake | 106/31.27 |
| 2004/0168608 A1 * | 9/2004 | Bauer et al. | 106/31.27 |

FOREIGN PATENT DOCUMENTS

| | | |
|---|---|---|
| EP | 0 808 882 | 11/1997 |
| EP | 0 879 857 | 11/1998 |
| EP | 0 952 196 | 10/1999 |
| EP | 1 172 421 | 1/2002 |
| EP | 1 308 486 | 5/2003 |
| JP | 6-57192 | 3/1994 |
| JP | 7-266689 | 10/1995 |
| JP | 8-267903 | 10/1996 |

OTHER PUBLICATIONS

Patent Abstracts of Japan, JP 11-349878 (JP 11-123741), Dec. 21, 1999, (with corr. US 6,036,759).
Patent Abstracts of Japan, JP 10-036724, Feb. 10, 1998, (with corr. US 5,700,317).
Derwent Abstracts, JP 2002-363459, Dec. 18, 2002.
Patent Abstracts of Japan, JP 2000-007964, Jan. 11, 2000, (with corr. US. 6,342,095).

* cited by examiner

Primary Examiner—J. A. Lorengo
Assistant Examiner—Veronica F. Faison
(74) Attorney, Agent, or Firm—Oblon, Spivak, McClelland, Maier & Neustadt, P.C.

(57) ABSTRACT

An ink set comprising at least one anionic chromatic colored ink and at least one cationic chromatic colored ink; and a recording process comprising the step of printing with an ink set comprising at least one anionic chromatic colored ink and at least one cationic chromatic colored ink. The ink set can be suitably used for a printer for inkjet recording or the like.

9 Claims, No Drawings

INK SET

FIELD OF THE INVENTION

The present invention relates to an ink set. More specifically, the present invention relates to an ink set which can be suitably used for a printer for inkjet recording and the like.

BACKGROUND OF THE INVENTION

Inkjet recording is a recording system for forming characters or images, comprising directly jetting ink droplets from very fine nozzles to a recording medium, and depositing the ink droplets on the recording medium. This system has some advantages such that not only the device shows excellent operability at a low level of noise, but also the coloration is facilitated and plain paper can be used as a recording medium.

With the widespread of the inkjet recording process, improvement in color image quality for specialized paper has been made. When the ink penetrates a paper, improvements in inks and paper have been made for contrivance not to cause bleeding, contrivance to increase drying speed, and contrivance to allow a coloring material to stay on a surface of paper, so that a high-quality printing can be accomplished.

On the other hand, improvements in color image quality against plain paper have been studied. For instance, a process for printing with two solutions containing an ink containing a colorant and a solution containing a polyallylamine has been known as disclosed, for instance, in Japanese Patent Laid-Open Nos. Hei 07-266689 and Hei 08-267903.

Also, some proposals have been made to improve color image qualities by using an ink set comprising a black ink containing an anionic dye and a yellow ink containing a cationic dye and a polyvalent precipitating agent as disclosed, for instance, in Japanese Patent Laid-Open Nos. Hei 06-57192; an ink set comprising a black ink containing an anionic pigment and a colored ink containing a component for supplying a cation as disclosed, for instance, in Japanese Patent Laid-Open Nos. Hei 11-123741; an ink set which induces a water-phase separation when an aqueous medium containing a first ink is contacted with an aqueous medium containing a second ink as disclosed, for instance, in Japanese Patent Laid-Open Nos. Hei 10-36724; and an ink set containing at least two colored inks which are gelated by lowering its pH as disclosed, for instance, in Japanese Patent Laid-Open Nos. 2002-363459.

However, these ink sets have a main purpose of suppressing bleeding. Therefore, there are some defects in that the ink sets have insufficient light-fastness when a dye is used as a colorant, and deficient optical density when a pigment is used as a colorant. Especially, when high-speed printing is carried out by lowering resolution, there is a defect that optical density becomes unsatisfactory.

There have been tried to increase the amount of the colorant contained in an ink or the amount of ink jetted, or change the composition of an ink, and the like for the purpose of increasing optical density of colored inks on plain paper. However, when high-speed printing is carried out at a low resolution, printed image still has unsatisfactory optical density on plain paper. Especially, when high-speed printing is carried out with a secondary color, the amount of the ink jetted becomes large, so that the penetration of the ink is accelerated, whereby a wide color reproducible range cannot be obtained.

In a black ink for which a secondary color does not have to be taken into consideration as in the colored ink, an ink set having two kinds of inks having different polarities from each other as black inks has been proposed as disclosed in, for instance, Japanese Patent Laid-Open No. 2000-7964. However, currently, optical density on plain paper cannot be said to be satisfactory even when two kinds of black inks having different polarities from each other are used.

SUMMARY OF THE INVENTION

The present invention relates to:
(1) an ink set comprising at least one anionic chromatic colored ink and at least one cationic chromatic colored ink; and
(2) a recording process comprising the step of printing with an ink set comprising at least one anionic chromatic colored ink and at least one cationic chromatic colored ink.

DETAILED DESCRIPTION OF THE INVENTION

All publications cited herein are hereby incorporated by reference.

The present invention relates to an ink set capable of giving higher optical density and wider color reproducible range. Also, the present invention relates to an ink set for inkjet recording, which is further excellent in water resistance and light fastness.

These and other advantages of the present invention will be apparent from the following description.

It is preferable that the chromatic colored ink usable in the present invention is at least one member selected from the group consisting of magenta ink, cyan ink and yellow ink, and it is more preferable that the chromatic colored inks are magenta ink, cyan ink and yellow ink.

It is preferable that the ink set of the present invention further contains a black ink. The preferred "black ink" is exemplified by an ink having a color difference in which $L^*$ is at most 50, $a^*$ is at least −5 and at most 5, and $b^*$ is at least −5 and at most 5 when the color difference is expressed by the CIELAB which is determined by a reflected light of a printout of high-grade plain paper commercially available from EPSON under the trade name of KA4250NT at a wave length of light of D65/2° using an apparatus commercially available from Nippon Denshoku Kogyo K.K. under the trade name of NIPPON DENSHOKU Spectro Color Meter SE 2000.

The term "chromatic colored ink" as referred to herein means an ink other than a black ink and a white ink. In addition, the term "colored ink" as referred to herein means both the chromatic colored ink and the black ink.

As the black ink, it is preferable to use an anionic colored ink and/or a cationic colored ink, more preferably two kinds of inks of the anionic colored ink and the cationic colored ink.

The colorant usable in the black ink includes those listed in the section of [Colorant] given below, for instance, C.I. Solvent Black 3, 7, 27, 29 and 34, carbon black, C.I. Pigment Black 7 and the like.

The components usable in the present invention will be explained hereinbelow.

[Colorant]

Any one of dyes and pigments can be used in the chromatic colored ink and the black ink. Any one of those dyes and pigments may be selected depending upon the purpose of use or the like of the ink set of the present invention. Alternatively, both dye and pigment may be used in admixture.

The dye is not limited to specified ones, and any one of hydrophobic dyes and water-soluble dyes may be used.

Examples of the hydrophobic dye include oil-soluble dyes, disperse dyes, basic dye and the like. Among them, oil-soluble dyes and disperse dyes are preferable because these dyes can be favorably contained in the polymer particles.

The oil-soluble dye is not limited to specified ones. The oil-soluble dye includes, for instance, C. I. Solvent Black 3, 7, 27, 29 and 34; C. I. Solvent Yellow 14, 16, 29, 56 and 82; C. I. Solvent Red 1, 3, 8, 18, 24, 27, 43, 51, 72 and 73; C. I. Solvent Violet 3; C. I. Solvent Blue 2, 11 and 70; C. I. Solvent Green 3 and 7; C. I. Solvent Orange 2; and the like.

The disperse dye is not limited to specified ones. Preferable examples of the disperse dye include C. I. Disperse Yellow 5, 42, 54, 64, 79, 82, 83, 93, 99, 100, 119, 122, 124, 126, 160, 184:1, 186, 198, 199, 204, 224 and 237; C. I. Disperse Orange 13, 29, 31:1, 33, 49, 54, 55, 66, 73, 118, 119 and 163; C. I. Disperse Red 54, 60, 72, 73, 86, 88, 91, 93, 111, 126, 127, 134, 135, 143, 145, 152, 153, 154, 159, 164, 167:1, 177, 181, 204, 206, 207, 221, 239, 240, 258, 277, 278, 283, 311, 323, 343, 348, 356 and 362; C. I. Disperse Violet 33; C. I. Disperse Blue 56, 60, 73, 87, 113, 128, 143, 148, 154, 158, 165, 165:1, 165:2, 176, 183, 185, 197, 198, 201, 214, 224, 225, 257, 266, 267, 287, 354, 358, 365 and 368; C. I. Disperse Green 6:1 and 9; and the like.

The hydrophobic dye is preferably one which dissolves in an organic solvent (for instance, methyl ethyl ketone at 20° C.) in an amount of at least 2 g/L, preferably 20 to 500 g/L, from the viewpoint of efficiently containing the hydrophobic dye in the water-insoluble polymer particles described below.

Examples of the water-soluble dye include acid dyes, reactive dyes and the like.

The acid dye is not limited to specified ones. The acid dye includes, for instance, C. I. Acid Orange 67; C. I. Acid Yellow 127; C. I. Acid Red 138 and 265; C. I. Acid Blue 140 and 185; and the like.

The reactive dye is not limited to specified ones. The reactive dye includes, for instance, C. I. Reactive Yellow 2, 17, 85 and 95; C. I. Reactive Orange 5 and 13; C. I. Reactive Red 3:1, 22, 24 and 33; C. I. Reactive Blue 2, 5, 19 and 49; and the like.

The direct dye is not limited to specified ones. The direct dyes include, for instance, polyazo dyes, trizine dyes, dianisidine azo dyes, stilbene azo dyes, thiazole azo dyes, diaminodiphenylamine azo dyes and the like.

The dye having an anionic group refers to a dye having an acid functional group such as carboxyl group, phosphonate group, phosphate group, sulfonate group or sulfate group. The dye having an anionic group is preferably the above-mentioned acid dyes and the like.

The dye having a cationic group refers to a dye having a basic functional group such as amino group or ammonium group. The dye having a cationic group is preferably the above-mentioned direct dyes.

The pigment is not limited to specified ones, and any one of known inorganic pigments and organic pigments can be used. In addition, those pigments can be used together with an extender pigment, as occasion demands. The inorganic pigment includes carbon black, metal oxides, metal sulfides, metal chlorides, and the like. The carbon black includes furnace black, thermal lamp black, acetylene black, channel black and the like.

The organic pigment includes, for instance, azo pigments, diazo pigments, phthalocyanine pigments, quinacridone pigments, isoindolinone pigments, dioxazine pigments, perylene pigments, perinone pigments, thioindigo pigments, anthraquinone pigments, quinophthalone pigments and the like. The extender includes, for instance, silica, calcium carbonate, talc and the like.

As the pigment, a self-dispersible pigment in which a hydrophilic group is bonded to the pigment directly or via the other atomic group is preferable. The self-dispersible pigment includes, for instance, those pigments disclosed in Japanese Patent Laid-Open Nos. Hei 10-140064 and Hei 10-110127, and the like. Specific examples of the self-dispersible pigment include a product commercially available from Cabot Corporation under the trade name of CAB-O-JET(registered trade mark) 300, and the like. The self-dispersible pigment is preferable from the viewpoint of increasing optical density.

[Water-Soluble Polymer]

In order to disperse a colorant in an ink, a water-soluble polymer can be used.

The water-soluble polymer includes water-soluble vinyl polymers, water-soluble ester polymers, water-soluble urethane polymers and the like. Among those polymers, the water-soluble vinyl polymers are preferable.

The term "water-soluble polymer" as used herein refers to a polymer which dissolves in 100 g of water in an amount of at least 1 g at 25° C. after neutralization. Also, the "water-insoluble polymer" as used herein refers to a polymer other than the above-mentioned water-soluble polymer.

The water-soluble vinyl polymer includes a copolymer prepared by polymerizing a monomer composition comprising a monomer having a salt-forming group (a) and a hydrophobic monomer (b). This monomer composition may contain a nonionic hydrophilic monomer (c) as occasion demands.

The monomer having a salt-forming group (a) includes anionic monomers and cationic monomers.

Examples of the anionic monomer include unsaturated carboxylic acid monomers, unsaturated sulfonic acid monomers, unsaturated phosphoric acid monomers, and the like.

The unsaturated carboxylic acid monomer includes, for instance, (meth)acrylic acid [(meth)acrylic acid means acrylic acid, methacrylic acid or mixture thereof], styrenecarboxylic acid, maleic acid-based monomer [maleic anhydride, maleic acid, monoester of maleic acid, maleic acid monoamide or a mixture of at least two kinds thereof], itaconic acid and the like. Those monomers can be used alone or in admixture of at least two kinds.

The unsaturated sulfonic monomer includes, for instance, 2-(meth)acryloyloxyethanesulfonic acid, 2-(meth)acryloyloxypropanesulfonic acid, 2-(meth)acrylamide-2-alkyl (number of carbon atoms of which is 1 to 4)propanesulfonic acids, vinylsulfonic acid, styrenesulfonic acid and the like. Those monomers can be used alone or in admixture of at least two kinds.

The unsaturated phosphate monomer includes, for instance, vinylphosphonic acid, vinyl phosphate, bis(methacroxyethyl) phosphate, diphenyl-2-acryloyloxyethyl phosphate, diphenyl-2-methacryloyloxyethyl phosphate, dibutyl-2-acryloyloxyethyl phosphate, dibutyl-2- methacryloyloxyethyl phosphate and the like. Those monomers can be used alone or in admixture of at least two kinds.

Among the anionic monomers, the unsaturated carboxylic acid monomer is preferable, among which acrylic acid and methacrylic acid are preferable.

Examples of the cationic monomer include tertiary amine-containing unsaturated monomers, ammonium salt-containing unsaturated monomers and the like.

Specific examples of the cationic monomer include N,N-dimethylaminoethyl (meth)acrylate, N—(N',N'-dimethylaminopropyl) (meth)acrylamide, vinylpyrrolidone, methacryloyloxyethyltrimethylammoniummethyl sulfate, methacryloyloxyethyldimethylethylammoniummethyl sulfate and the like. Among them, N,N-dimethylaminoethyl (meth)acrylate is preferable.

The hydrophobic monomer (b) includes, for instance, (meth)acrylates such as methyl (meth)acrylate, ethyl (meth)acrylate, (iso)propyl (meth)acrylate, (iso or tertiary)butyl (meth)acrylate, (iso)amyl (meth)acrylate, cyclohexyl (meth)acrylate, benzyl (meth)acrylate, 2-ethylhexyl (meth)acrylate, (iso)octyl (meth)acrylate, (iso)decyl (meth)acrylate, (iso)dodecyl (meth)acrylate and (iso)stearyl (meth)acrylate; styrenic monomers such as styrene, vinyltoluene, 2-methylstyrene and chlorostyrene; and the like. Those monomers can be used alone or in admixture of at least two kinds.

Incidentally, the above-mentioned "(iso or tertiary)" and "(iso)" include both of the case where these groups are present and the case where these groups are absent. When these groups are absent, the monomer is in the form of normal.

The nonionic hydrophilic monomer (c) includes 2-hydroxyethyl (meth)acrylate, 3-hydroxypropyl (meth)acrylate, polyethylene glycol (n=2–30) (meth)acrylates, polypropylene glycol (n=2–30) (meth)acrylates, monoalkoxy(number of carbon atoms of which is 1 to 12)polypropylene glycol (n=2–30) (meth)acrylates, poly(ethylene glycol (n=1–15)·propylene glycol (n=1–15)) (meth)acrylate, monoalkoxy (number of carbon atoms of which is 1 to 12)polyethylene glycol (n=2–30) (meth)acrylates, and the like. Among them, polyethylene glycol (n=2–30) (meth)acrylates and monoalkoxy(number of carbon atoms of which is 1 to 12)polyethylene glycol (n=2–30) (meth)acrylates are preferable.

The ratio of the monomer having a salt-forming group (a), the hydrophobic monomer (b) and the nonionic hydrophilic monomer (c) is not limited to specified ones, as long as these monomers are water-soluble after neutralization, and give excellent dispersion stability of the colorant in the ink and jetting property of the ink. It is preferable that the ratio of the monomer having a salt-forming group (a)/hydrophobic monomer (b)/nonionic hydrophilic monomer (c) [weight ratio] is usually 1–100/0–70/0–50.

It is desired that the weight-average molecular weight of the water-soluble polymer is 500 to 30000, preferably 800 to 20000, more preferably 1000 to 10000 in consideration of dispersion stability of the colorant in the ink and ink viscosity. The weight-average molecular weight of the water-soluble polymer can be determined by gel chromatography described in Examples set forth below prior to neutralization.

It is preferable that the water-soluble polymer is neutralized. The neutralization degree is not limited to specified ones, as long as the dispersion stability of the colorant in the ink can be sufficiently maintained. It is preferable that the neutralizing agent is usually added in an amount of 30 to 200% by mol per 1 mol of the salt-forming group of the monomer having a salt-forming group, which constitutes the water-soluble polymer.

The neutralizing agent usable for the neutralization can be appropriately selected depending upon the kind of the salt-forming group of the water-soluble polymer. For instance, when a cationic monomer is used in the water-soluble polymer, the neutralizing agent includes acetic acid, methoxyacetic acid, propionic acid, lactic acid, succinic acid, glycollic acid, gluconic acid, glyceric acid and the like. Also, when an anionic monomer is used in the water-soluble polymer, the neutralizing agent includes a tertiary amine such as trimethylamine or triethylamine, sodium hydroxide, potassium hydroxide, lithium hydroxide, ammonia or the like.

In order that the water-soluble polymer is an anionic polymer, it is preferable that an anionic monomer is used in the above-mentioned monomer composition as the salt-forming group-containing monomer.

In order that the water-soluble polymer is a cationic polymer, it is preferable that a cationic monomer is used in the above-mentioned monomer composition as the salt-forming group-containing monomer.

The anionic polymer which can be suitably used in the ink set of the present invention includes polyacrylic acids or salts thereof, polymethacrylic acids or salts thereof, styrene-acrylic acid copolymers or salts thereof, styrene-acrylic acid-alkyl acrylate copolymers or salts thereof, styrene-maleic acid copolymers or salts thereof, styrene-maleic acid-alkyl acrylate copolymers or salts thereof, styrene-methacrylic acid copolymers or salts thereof, styrene-methacrylic acid-alkyl acrylate copolymers or salts thereof, styrene-maleic acid half ester copolymers or salts thereof, vinylnaphthalene-maleic acid copolymers or salts thereof, alginic acid or salts thereof, polysaccharides such as carboxymethyl cellulose or salts thereof, polyvinyl sulfate or salts thereof, and the like. The above-mentioned salts include alkali metal salts of lithium, sodium and potassium, ammonium salts, alkylamine salts, alkanolamine salts, and the like.

The cationic polymer which can be suitably used in the ink set of the present invention includes polyalkyleneimines such as polyethyleneimine and polyisopropyleneimine; polyamines such as polyalkylene-polyamine and polyamide-polyamine epichlorohydrin; water-soluble aniline resins and salts thereof; and the like.

It is desired that the amount of the water-soluble polymer is 5 to 100 parts by weight, preferably 10 to 80 parts by weight, more preferably 15 to 60 parts by weight based on 100 parts by weight of the colorant from the viewpoints of dispersion stability of the colorant in the ink and jetting property of the ink.

[Water-Insoluble Polymer]

In order to disperse a colorant in the ink, a water-insoluble polymer can be used. In order to suppress thickening, it is preferable to use a water-insoluble polymer.

The water-insoluble polymer includes water-insoluble vinyl polymers, water-insoluble ester polymers, water-insoluble urethane polymers and the like. Among those polymers, the water-insoluble vinyl polymers are preferable.

The water-insoluble vinyl polymer includes a copolymer prepared by polymerizing a monomer composition comprising a monomer having a salt-forming group (a) and a hydrophobic monomer (b). This monomer composition may contain a nonionic hydrophilic monomer (c) and/or a macromer (d) as occasion demands. Among them, it is preferable to use the macromer (d), from the viewpoints of dispersion stability of the colorant in the ink and jetting stability of the ink.

The monomer having a salt-forming group (a), the hydrophobic monomer (b) and the nonionic hydrophilic monomer (c) may be the same ones as those exemplified in the above-mentioned water-soluble polymer.

The macromer (d) includes a macromer which is a monomer having a polymerizable unsaturated group and a number-average molecular weight of preferably 500 to 100000, more preferably 1000 to 20000. The weight-average molecular weight of the macromer (d) is determined by gel permeation chromatography using chloroform containing 1 mmol/L dodecyldimethylamine as a solvent, and polystyrene as a standard substance.

Representative examples of the macromer (d) include silicone macromers and styrenic macromers. Those can be used alone or in admixture.

Among the silicone macromers, a silicone macromer represented by the formula (I):

$$X^1(Y^1)_q Si(R^1)_{3-r}(Z^1)_r \quad (I)$$

wherein $X^1$ is a polymerizable unsaturated group; $Y^1$ is a divalent group; each of $R^1$ is independently hydrogen atom, a lower alkyl group having 1 to 5 carbon atoms, an aryl group having 6 to 10 carbon atoms or an alkoxy group having 2 to 12 carbon atoms; $Z^1$ is a monovalent siloxane polymer residue having a number-average molecular weight of at least 500; q is 0 or 1; and r is an integer of 1 to 3, can be favorably used from the viewpoint of preventing scorching on the printer head of an inkjet printer.

In the silicone macromer represented by the formula (I), $X^1$ includes a monovalent unsaturated hydrocarbon group having 2 to 6 carbon atoms, such as $CH_2=CH-$ group or $CH_2=C(CH_3)-$ group. $Y^1$ includes a divalent group such as $-COO-$ group, a $-COO(CH_2)_a-$ group wherein a is an integer of 1 to 5, and phenylene group. Among them, $-COOC_3H_6-$ is preferable. $R^1$ includes hydrogen atom; a lower alkyl group having 1 to 5 carbon atoms, such as methyl group or ethyl group; an aryl group having 6 to 20 carbon atoms, such as phenyl group; an alkoxy group having 1 to 20 carbon atoms, such as methoxy group; and the like. Among them, methyl group is preferable. $Z^1$ is preferably a monovalent siloxane polymer residue having a number-average molecular weight of 500 to 5000. q is 0 or 1, and preferably 1. r is an integer of 1 to 3, and preferably 1.

Representative examples of the silicone macromer include a silicone macromer represented by the formula (I-1):

$$CH_2=CR^2-COOC_3H_6-[Si(R^3)_2-O]_b-Si(R^3)_3 \quad (I-1)$$

wherein $R^2$ is hydrogen atom or methyl group; each of $R^3$ is independently hydrogen atom or a lower alkyl group having 1 to 5 carbon atoms; and b is a number of 5 to 60;
a silicone macromer represented by the formula (I-2):

$$CH_2=CR^2-COO-[Si(R^3)_2-O]_b-Si(R^3)_3 \quad (I-2)$$

wherein $R^2$, $R^3$ and b are the same as defined above;
a silicone macromer represented by the formula (I-3):

$$CH_2=CR^2-Ph-[Si(R^3)_2-O]_b-Si(R^3)_3 \quad (I-3)$$

wherein Ph is phenylene group; and $R^2$, $R^3$ and b are the same as defined above;
a silicone macromer represented by the formula (I-4):

$$CH_2=CR^2-COOC_3H_6-Si(OE)_3 \quad (I-4)$$

wherein $R^2$ is the same as defined above; E is a group represented by the formula: $-[Si(R^2)_2-O]_c-Si(R^2)_3$ wherein $R^2$ is the same as defined above, and c is a number of 5 to 65;
and the like.

Among these silicone macromers, the silicone macromer represented by the formula (I-1) is preferable. Especially, a silicone macromer represented by the formula (I-1a):

$$CH_2=C(CH_3)-COOC_3H_6-[Si(CH_3)_2-O]_d-Si(CH_3)_3 \quad (I-1a)$$

wherein d is a number of 8 to 40, is preferable. Examples of the commercially available silicone macromer include a silicone macromer commercially available from CHISSO CORPORATION under the trade name of FM-0711, and the like.

The styrenic macromer can be favorably used, from the viewpoint of sufficiently including a pigment in the vinyl polymer.

Representative examples of the styrenic macromer include styrene homopolymers having a polymerizable functional group at one end, or copolymers of styrene with the other monomer. Among them, those having acryloyloxy group or methacryloyloxy group as a polymerizable functional group at one end are preferable.

The content of styrene in the copolymer of styrene and the other monomer is preferably at least 60% by weight, more preferably at least 70% by weight, from the viewpoint of sufficiently including a pigment in the vinyl polymer. The other monomer mentioned above includes, for instance, acrylonitrile and the like.

The content of the monomer having a salt-forming group (a) in the water-insoluble vinyl polymer is preferably 1 to 50% by weight, more preferably 2 to 40% by weight from the viewpoint of dispersion stability of the resulting dispersion.

The content of the hydrophobic monomer (b) in the water-insoluble vinyl polymer is preferably 5 to 93% by weight, more preferably 10 to 80% by weight from the viewpoints of optical density and dispersion stability.

The content of the nonionic hydrophilic monomer (c) in the water-insoluble vinyl polymer is preferably 0 to 40% by weight, more preferably 5 to 30% by weight from the viewpoints of jetting stability and optical density.

The content of the macromer (d) in the water-insoluble vinyl polymer is preferably 0 to 30% by weight, more preferably 1 to 25% by weight, even more preferably 5 to 20% by weight from the viewpoint of suppressing scorching of the surface of the heater in the bubblejet inkjet printer, and from the viewpoint of dispersion stability.

In order that the water-insoluble polymer such as a water-insoluble vinyl polymer is an anionic polymer, it is preferable that an anionic monomer is used in the above-mentioned monomer composition as the monomer having a salt-forming group.

In order that the water-insoluble polymer such as a water-insoluble vinyl polymer is a cationic polymer, it is preferable that a cationic monomer is used in the above-mentioned monomer composition as the monomer having a salt-forming group.

The weight-average molecular weight of the water-insoluble polymer is preferably 1000 to 500000, more preferably 1500 to 400000, even more preferably 2000 to 300000 in consideration of dispersion stability of the colorant in the ink and viscosity of the ink. The weight-average molecular weight of the water-insoluble polymer is determined in the same manner as that of the above-mentioned water-soluble polymer.

It is preferable that the water-insoluble polymer is neutralized. The neutralization degree is not limited to specified ones, as long as the water-soluble polymer shows sufficient dispersion stability. It is preferable that the neutralizing agent is usually added in an amount of 30 to 200% by mol per 1 mol of the salt-forming group of the monomer having a salt-forming group (a), which constitutes the water-insoluble polymer.

The neutralizing agent usable for the neutralization can be appropriately selected depending upon the kind of the salt-forming group of the water-insoluble polymer. Examples of the neutralizing agent are the same ones as those of the water-soluble polymer.

The amount of the water-insoluble polymer is preferably 5 to 250 parts by weight, more preferably 10 to 180 parts by weight, even more preferably 15 to 130 parts by weight based on 100 parts by weight of the pigment and the hydrophobic dye, from the viewpoints of dispersion stability of the colorant in the ink, and a balance between jetting property, rubbing resistance and high-lighter fastness.

[Surfactant]

In order to disperse a colorant in the ink, a surfactant can be used. The surfactant includes anionic surfactants, cationic surfactants, nonionic surfactants and amphoteric surfactants.

Examples of the anionic surfactant include salts of fatty acids, salts of alkylsulfuric esters, alkylarylsulfonates, alkylnaphthalenesulfonates, dialkylsulfonates, dialkylsulfosuccinates, alkyl diaryl ether disulfonates, alkyl phosphates, polyoxyethylene alkyl ether sulfates, polyoxyethylene alkylaryl ether sulfates, condensates of naphthalenesulfonic acid and formaldehyde, polyoxyethylene alkyl phosphates, carboxylic acid-based polymer surfactants and the like. The salts include alkali metal salts, ammonium salts and the like.

Examples of the nonionic surfactant include polyoxyethylene alkyl ethers, polyoxyethylene alkylaryl ethers, polyoxyethylene-oxypropylene block copolymers, sorbitan fatty acid esters, polyoxyethylene sorbitan fatty acid esters, polyoxyethylene sorbitol fatty acid esters, glycerol fatty acid esters, polyoxyethylene fatty acid esters, polyoxyethylene alkylamines, fluorine-containing nonionic surfactants, silicone-based nonionic surfactants and the like.

Examples of the cationic surfactant include salts of alkylamines, quaternary ammonium salts, alkylpyridinium salts, alkylimidazolinium salts and the like. The anions constituting the salts include halogen ions, organic anions and the like.

Examples of the amphoteric surfactant include alkylbetaines, alkylamine oxides, imidazolinium betaines and the like.

Among the surfactants, from the viewpoints of dispersion stability and jetting property, the anionic surfactants are preferably sodium salts of a condensate of β-naphthalenesulfonic acid and formaldehyde (for instance, those commercially available from Kao Corporation under the trade names of DEMOL N, DEMOL RN, DEMOL MS and the like), carboxylic acid-based polymer surfactants (for instance, those commercially available from Kao Corporation under the trade names of POISE 520, POISE 521, POISE 530 and the like), and the cationic surfactants are preferably quaternary ammonium salts (for instance, those commercially available from Kao Corporation under the trade names of QUARTAMIN 24P, QUARTAMIN 60W, QUARTAMIN D86P, and the like).

The amount of the surfactant is preferably 1 to 120 parts by weight, more preferably 3 to 70 parts by weight, even more preferably 5 to 30 parts by weight, based on 100 parts by weight of the colorant from the viewpoints of dispersion stability of the colorant in the ink and jetting property of the ink.

[Aqueous Dispersion of Water-Insoluble Polymer Particles in Which Pigment and/or Hydrophobic Dye is Contained in Water-Insoluble Polymer]

The aqueous dispersion usable in the present invention is preferably an aqueous dispersion of water-insoluble polymer particles in which a pigment and/or a hydrophobic dye, which is a colorant, is contained in the water-insoluble polymer.

A process for preparing an aqueous dispersion of water-insoluble polymer particles in which a pigment or a hydrophobic dye, which is a colorant, is contained in the water-insoluble polymer will be explained hereinbelow. The pigment or hydrophobic dye can be the same ones as those described in the above-mentioned colorant.

The water-insoluble polymer can be prepared by polymerizing a monomer composition comprising a monomer having monomer having a salt-forming group (a) and a hydrophobic monomer (b), and a nonionic hydrophilic monomer (c) and/or a macromer (d) as occasion demands, by means of a polymerization method such as bulk polymerization method, solution polymerization method, suspension polymerization method, or emulsion polymerization method. Among these polymerization methods, the solution polymerization method is preferable. The water-insoluble polymer may be the same ones as those mentioned above.

It is preferable that the solvent used in the solution polymerization method is a polar organic solvent. When the polar organic solvent is a water-miscible organic solvent, the solvent can also be used by mixing with water.

The polar organic solvent includes, for instance, an aliphatic alcohol having 1 to 3 carbon atoms, such as methanol, ethanol and (iso)propanol; ketones such as acetone, methyl ethyl ketone and methyl isobutyl ketone; esters such as ethyl acetate; and the like. Among them, methanol, ethanol, acetone, methyl ethyl ketone, or a mixture of the polar organic solvent with water is preferable.

A radical polymerization initiator can be used in the polymerization. The radical polymerization initiator includes azo compounds such as 2,2'-azobisisobutyronitrile, 2,2'-azobis(2,4-dimethylvaleronitrile), dimethyl-2,2'-azobisbutyrate, 2,2'-azobis(2-methylbutyronitrile), and 1,1'-azobis(1-cyclohexanecarbonitrile); and organic peroxides such as t-butyl peroxyoctoate, di-t-butyl peroxide and dibenzoyl oxide.

The amount of the polymerization initiator is preferably 0.001 to 5 parts by weight, more preferably 0.01 to 2 parts by weight per 100 parts by weight of the monomer composition.

During the polymerization, a polymerization chain transfer agent can be further added. Specific examples of the polymerization chain transfer agent include mercaptans such as octyl mercaptan, n-dodecyl mercaptan, t-dodecyl mercaptan, n-tetradecyl mercaptan and mercaptoethanol; xanthogenndisulfides such as dimethyl xanthogenndisulfide and diisopropyl xanthogenndisulfide; thiuram disulfides such as tetramethyl thiuram disulfide and tetrabutyl thiuram disulfide; halogenated hydrocarbons such as carbon tetrachloride and ethylene bromide; hydrocarbons such as pentaphenylethane; unsaturated cyclic hydrocarbon compounds such as acrolein, methacrolein, allyl alcohol, 2-ethylhexyl thioglycolate, terpinolene, α-terpinene, γ-terpinene, diterpene, α-methylstyrene dimer, 9,10-dihydroanthracene, 1,4-dihydronaphthalene, indene and 1,4-cyclohexadiene; unsaturated heterocyclic compounds such as 2,5-dihydrofuran; and the like. Those can be used alone or in admixture of at least two kinds.

The conditions for polymerizing the monomer composition cannot be absolutely determined because the conditions differ depending upon kinds of the radical polymerization initiator, the monomers and the solvent used, and the like. It is preferable that the polymerization temperature is usually 30° to 100° C., preferably 50° to 80° C., and that the polymerization time is 1 to 20 hours. It is preferable that the atmosphere for polymerization is an inert gas such as nitrogen gas.

After the termination of the polymerization reaction, the polymer can be isolated from the reaction solution by a known method such as re-precipitation or solvent distillation. The resulting polymer can be purified by removing unreacted monomers and the like from the polymer by the repeat of re-precipitation, membrane separation, a chromatographic method, an extraction method or the like.

The aqueous dispersion of the polymer particles containing a hydrophobic dye can be prepared by a known emulsification method. The aqueous dispersion can be obtained, for instance, by dissolving the water-insoluble polymer and the hydrophobic dye in an organic solvent, adding a neutralizing agent as occasion demands to the resulting solution to ionize the salt-forming group of the water-insoluble polymer, adding water thereto, thereafter dispersing the resulting solution as occasion demands with a disperser or an ultrasonic emulsifier, and distilling off the organic solvent to phase-invert to a water-based system.

The aqueous dispersion of the water-insoluble polymer particles containing a pigment can be obtained, for instance, by dissolving the water-insoluble polymer in an organic solvent, adding a pigment, water and a neutralizing agent and a surfactant as occasion demands to the resulting solution, kneading the resulting mixture to give a paste, diluting the paste with water as occasion demands, and distilling off the organic solvent to give a water-based system.

[Colored Ink]

The content of the colorant in the colored ink usable in the ink set of the present invention is preferably 0.5 to 30% by weight, more preferably 1 to 20% by weight, even more preferably 2 to 15% by weight, from the viewpoint of giving sufficient optical density and from the viewpoint of jetting property. When the colorant is an aqueous dispersion of water-insoluble polymer particles, prepared by including the pigment and/or the hydrophobic dye in the water-insoluble polymer, the amount of the colorant is a solid ingredient of the aqueous dispersion.

In the ink set of the present invention, an anionic colored ink and a cationic colored ink are used. It is preferable that the anionic colored ink is a colored ink containing an anionic polymer or an anionic surfactant (1a), a colored ink containing a self-dispersible pigment having an anionic group on its surface (2a) or a colored ink containing a dye having an anionic group (3a).

In addition, it is preferable that the cationic colored ink is a colored ink containing a cationic polymer or a cationic surfactant (1b), a colored ink containing a self-dispersible pigment having a cationic group on its surface (2b) or a colored ink containing a dye having a cationic group (3b).

[Anionic Colored Ink]

When the colored ink is a colored ink containing an anionic polymer or an anionic surfactant (1a), the water-soluble polymer and/or the water-insoluble polymer mentioned above can be used as the anionic polymer. The water-insoluble polymer is preferable, and a water-insoluble polymer usable in the aqueous dispersion of water-insoluble polymer particles containing a pigment and/or a hydrophobic dye is more preferable.

The content of the anionic polymer in the colored ink is preferably 0.1 to 10% by weight, more preferably 0.5 to 5% by weight. Also, the content of the anionic surfactant in the colored ink is preferably 0.1 to 10% by weight, more preferably 0.5 to 5% by weight.

The pigment usable in the colored ink containing a self-dispersible pigment having an anionic group on its surface (2a) is preferably a self-dispersible pigment described in the above-mentioned colorant.

The preferable content of the self-dispersible pigment in the colored ink is the same as the preferable content of the colorant in the above-mentioned colored ink.

The dye usable in the colored ink containing a dye having an anionic group (3a) is preferably the anionic dye described in the above-mentioned colorant.

The preferable content of the anionic dye in the colored ink is the same as the preferable content of the colorant in the above-mentioned colored ink.

It is also preferable that the colored ink containing a self-dispersible pigment having an anionic group on its surface (2a) or the colored ink containing a dye having an anionic group (3a) further contains the above-mentioned anionic polymer of the water-soluble polymer and/or the water-insoluble polymer or the above-mentioned anionic surfactant. The preferable content of the anionic polymer and the anionic surfactant in the colored ink is the same as the preferable one for the above-mentioned colored ink containing an anionic polymer or an anionic surfactant (1a).

When the colored ink containing an anionic polymer or an anionic surfactant (1a), the colored ink containing a self-dispersible pigment having an anionic group on its surface (2a) or the colored ink containing a dye having an anionic group (3a) is used, both the anionic polymer and the anionic surfactant may be contained in the colored ink.

It is preferable that the anionic colored ink contains an anionic polymer and a pigment from the viewpoints of light fastness and water resistance.

[Cationic Colored Ink]

When the colored ink is a colored ink containing a cationic polymer or a cationic surfactant (1b), the water-insoluble polymer and/or the water-soluble polymer mentioned above can be used as the cationic polymer. The water-insoluble polymer is preferable, and a water-insoluble polymer usable in the aqueous dispersion of water-insoluble polymer particles containing a pigment and/or a hydrophobic dye is more preferable.

The content of the cationic polymer in the colored ink is preferably 0.1 to 10% by weight, more preferably 0.5 to 5% by weight. Also, the content of the cationic surfactant in the colored ink is preferably 0.1 to 10% by weight, more preferably 0.5 to 5% by weight.

When the colored ink is a colored ink containing a self-dispersible pigment having a cationic group on its surface (2b), it is preferable that the usable pigment is the self-dispersible pigment described in the above-mentioned colorant.

The preferable content of the self-dispersible pigment in the colored ink is the same as the preferable one of the colorant in the above-mentioned colored ink.

When the colored ink is a colored ink containing a dye having a cationic group (3a), it is preferable that the usable dye is the cationic dye described in the above-mentioned colorant.

The preferable content of the cationic dye in the colored ink is the same as the preferable content of the colorant in the above-mentioned colored ink.

It is also preferable that the colored ink containing a self-dispersible pigment having a cationic group on its surface (2b) or the colored ink containing a dye having a cationic group (3b) further contains the above-mentioned cationic polymer of the water-soluble polymer and/or the water-insoluble polymer or the above-mentioned cationic surfactant. The preferable contents of the cationic polymer and the cationic surfactant in the colored ink are the same as the preferable contents in the above-mentioned colored ink containing a cationic polymer or a cationic surfactant (1b).

When the colored ink containing a cationic polymer or a cationic surfactant (1b), the colored ink containing a self-dispersible pigment having a cationic group on its surface (2b) or the colored ink containing a dye having a cationic group (3b) is used, both the cationic polymer and the cationic surfactant may be contained.

It is preferable that the cationic colored ink contains a cationic polymer and a pigment from the viewpoints of light fastness and water resistance.

It is preferable that the colored ink usable in the present invention is a water-based ink. The water content in the water-based ink is preferably 40 to 90% by weight, more preferably 50 to 80% by weight.

Various additives, for instance, a wetting agent for a polyhydric alcohol, a dispersant, a defoaming agent, a mildewproof agent and/or a chelating agent, a pH adjusting agent and the like can be further added in proper amounts to the colored ink usable in the present invention.

The wetting agent includes, for instance, polyhydric alcohols or ethers thereof such as ethylene glycol, propylene glycol, diethylene glycol, triethylene glycol, alkyl diols having 4 to 8 carbon atoms, polyethylene glycol, glycerol, diethylene glycol diethyl ether and diethylene glycol mono-n-butyl ether; acetates; nitrogen-containing compounds such as N-methyl-2-pyrrolidone and 1,3-dimethylimidazolidinone; and the like. The amount of the wetting agent in the colored ink is preferably 0.1 to 50% by weight, more preferably 0.1 to 30% by weight.

As the dispersant, there can be used anionic, nonionic, cationic and amphoteric dispersants.

Furthermore, it is preferable that a pigment is contained in at least one of the anionic colored ink and the cationic colored ink from the viewpoints of light fastness and water resistance.

It is even more preferable that the colored ink usable in the ink set of the present invention is a water-based ink containing an aqueous dispersion of water-insoluble vinyl polymer particles containing a pigment and/or a hydrophobic dye because the ink can be designed to have a low viscosity, thereby improving jetting property, whereby printouts being excellent in water resistance and rubbing resistance can be obtained.

The pH of the anionic colored ink usable in the present invention is preferably at least 7 and at most 11, more preferably 8 to 11 at 20° C. Also, the pH of the cationic colored ink usable in the present invention is preferably at least 3 and less than 7, more preferably 3 to 6 at 20° C.

By adding an acid to the anionic colored ink to adjust its pH, the ink can be used as a cationic ink. Alternatively, by adding an alkali to the cationic colored ink to adjust its pH, the ink can be used as an anionic ink.

[Ink Set]

Since at least one anionic chromatic colored ink and at least one cationic chromatic color are used in the ink set of the present invention, the anionic colored ink and the cationic colored ink are aggregated when contacted with each other on a surface of paper, so that printouts having very high optical densities can be obtained even when printing is carried out at low resolution. Similar results can be obtained for all of the colored inks selected from magenta ink, yellow ink and cyan ink.

Especially, since inks are aggregated on the surface of paper in a secondary color or the like, the penetration of the inks would not be accelerated even when the jetting amount is increased, so that printouts having high optical densities can be obtained as compared to those printouts obtained from combinations of the colored inks of the same ionic property.

Here, the term "secondary color or the like" refers to a color toned by at least two colors selected from the group consisting of magenta ink, yellow ink and cyan ink.

When the secondary color or the like is printed, it is preferable that the combination of the anionic chromatic colored ink and the cationic chromatic colored ink has the same color since the optical density is increased. However, if a high-optical density can be accomplished, an anionic colored ink and a cationic colored ink having different colors from each other may be used from the viewpoint of economics. Furthermore, the combination of the colored inks can be varied in accordance with the printing quality or the kind of paper.

It is preferable that the ink set of the present invention has magenta ink, yellow ink and cyan ink. In each of the inks, it is more preferable to use a combination of an anionic colored ink and a cationic colored ink.

Also, the colorant usable in each of the inks may be used alone or in admixture of at least two kinds.

Furthermore, one ink set can contain at least two magenta inks, at least two yellow inks and/or at least cyan inks, each having a different colorant from each other.

When the ink is printed on a specialized paper, the obtained printouts have a high optical density without using inks having different ionic properties from each other since a colorant remains on the surface of paper. It is preferable that printing is carried out using inks having different ionic properties from each other in order to further increase the optical density. Furthermore, the combination of the used inks can be varied in accordance with the printing quality or the kind of paper.

In a case of a chromatic ink set in which a black ink is not used, a black color can be printed by a composite black obtained from magenta ink, yellow ink and cyan ink. On the other hand, in a case of an ink set in which the black ink is used, a black color can be printed with the composite black or the black ink. The composite black ink or the black ink can be used in accordance with the printing quality or the kind of paper. In addition, two black inks having different ionic properties with each other can be used. Furthermore, a high optical density can be obtained by printing with an ionic chromatic colored ink that is not a black ink and then printing with a black ink.

Furthermore, since the ink set of the present invention is aggregated quicker than the rate of causing color mixing, whereby the ink set can suppress the diffusion of the colorant, the ink set exhibits an excellent effect of preventing color mixing. In addition, since the individual colorants tend to remain on a surface of paper, the printouts can enjoy a wider color reproducible range different from the monochromatic color range desired in the black ink.

The ink set of the present invention can be suitably used as an ink set for inkjet recording. Especially, the optical density can be increased even when printing is carried out in a higher speed.

[Recording Process]

According to the present invention, the recording can be carried out by printing with an ink set containing at least one anionic chromatic colored ink and at least one cationic chromatic colored ink.

When the ink set of the present invention is used, the anionic colored ink may be firstly allowed to exist on a recording medium and thereafter the cationic colored ink is allowed to exist on the recording medium. Alternatively, the cationic colored ink may be firstly allowed to exist on a recording medium and thereafter the anionic colored ink is allowed to exist on the recording medium. As a process of allowing both of the anionic colored ink and the cationic colored ink to coexist on a recording medium, both of the inks may be allowed to exist on the same position of a recording dot, or each of the inks may be alternately allowed to exist on adjacent dots. It is necessary that both of the inks are contacted with each other on the recording medium.

The time period for the other ink to be allowed to exist on the recording medium after one of the colored inks is allowed to exist on the recording medium is not limited to specified ones. The time period is preferably within several seconds, more preferably within 2 seconds.

When the recording is carried out with a secondary color or the like, it is preferable that the colored inks have the same color from the viewpoint of increasing optical density, but the colored inks may have different colors from each other. When the secondary color or the like is printed with the same color, the optical density becomes especially high since each of the anionic colored ink and the cationic colored ink is printed at least twice.

EXAMPLES

The following examples further describe and demonstrate embodiments of the present invention. The examples are given solely for the purposes of illustration and are not to be construed as limitations of the present invention.

Preparation Examples 1 and 2

A reaction vessel was charged with 20 parts by weight of methyl ethyl ketone and 0.03 parts by weight of a polymerization chain transfer agent (2-mercaptoethanol), and 10% of the amount expressed in parts by weight of each monomer listed in Table 1, and nitrogen gas replacement was sufficiently carried out, to give a mixed solution.

On the other hand, a dropping funnel was charged with 90% of the amount expressed in parts by weight of each monomer listed in Table 1, and 0.27 parts by weight of a polymerization chain transfer agent (2-mercaptoethanol), 60 parts by weight of methyl ethyl ketone and 1.2 parts by weight of 2,2'-azobis(2,4-dimethylvaleronitrile) were added to the dropping funnel. Nitrogen gas replacement was sufficiently carried out, to give a mixed solution.

The temperature of the mixed solution in the reaction vessel was raised to 65° C., with stirring the mixed solution under nitrogen atmosphere. The mixed solution in the dropping funnel was gradually added dropwise to the mixed solution in the reaction vessel over a period of 3 hours. After 2 hours passed from the termination of the dropwise addition at 65° C., a solution prepared by dissolving 0.3 parts by weight of 2,2'-azobis(2,4-dimethylvaleronitrile) in 5 parts by weight of methyl ethyl ketone was added thereto, and the resulting mixture was aged at 65° C. for 2 hours, and then at 70° C. for 2 hours to give a polymer solution.

A part of the resulting polymer solution was dried at 105° C. under reduced pressure for 2 hours, and isolated by removing the solvent. In Preparation Example 1, the weight-average molecular weight was determined by gel permeation chromatography using polystyrene as a standard substance, and dimethylformamide containing 60 mmol/L phosphoric acid and 4.5 mmol/L lithium bromide as a solvent. In Preparation Example 2, the weight-average molecular weight was determined by gel permeation chromatography using polystyrene as a standard substance, and chloroform containing 1 mmol/L dodecyldimethylamine as a solvent. The results are shown in Table 1.

The details of the compounds shown in Table 1 are as follows:

Polypropylene glycol monomethacrylate: commercially available from Aldrich, Japan K.K., number-average molecular weight: 375.

Styrenic macromer: commercially available from TOAGOSEI CO., LTD. under the trade name of AS-6, number-average molecular weight: 6000, polymerizable functional group: methacryloyl group.

TABLE 1

| Prep. Ex. No. | Monomer Composition (parts by weight) | | | | | Weight-Average Molecular Weight |
|---|---|---|---|---|---|---|
| | Methacrylic Acid | Dimethylaminoethyl Monomethacrylate | Polypropylene Glycol Monomethacrylate | Styrene Monomer | Styrenic Macromer | |
| 1 | 10 | 0 | 25 | 50 | 15 | 129000 |
| 2 | 0 | 20 | 25 | 40 | 15 | 87000 |

Preparation Example 3

Six parts by weight of a polymer obtained by drying the polymer solution obtained in Preparation Example 1 under reduced pressure was dissolved in 45 parts by weight of methyl ethyl ketone. A given amount of a neutralizing agent (20% aqueous sodium hydroxide) was added thereto to neutralize a salt-forming group. Further, 18 parts by weight of a quinacridone pigment [C.I. Pigment Red 122] was added thereto, and the resulting mixture was kneaded with a triple roller-mill for 1 hour.

One-hundred and twenty parts by weight of ion-exchanged water was added to the resulting kneaded mixture with stirring. Thereafter, methyl ethyl ketone was removed at 60° C. under reduced pressure, and a part of water was further removed, to give an aqueous dispersion of vinyl polymer particles containing a pigment, the solid content of which was 20% by weight.

Forty parts by weight of the resulting aqueous dispersion of vinyl polymer particles containing a pigment, 10 parts by weight of glycerol, 5 parts by weight of 2-pyrrolidone, 2 parts by weight of isopropyl alcohol and 43 parts by weight of ion-exchanged water were mixed together. The resulting mixture was filtered with a 25-mL needle-less syringe [commercially available from TERUMO CORPORATION] equipped with a 0.5 μm filter [acetyl cellulose membrane, outer diameter: 2.5 cm, commercially available from Fuji Photo Film Co., Ltd.], thereby removing coarse grains, and additives and water were added thereto so as to have a composition as shown in Table 2, to give a water-based ink the pH of which was 9.6 at 20° C.

Preparation Example 4

Six parts by weight of a polymer obtained by drying the polymer solution obtained in Preparation Example 1 under reduced pressure was dissolved in 45 parts by weight of methyl ethyl ketone. A given amount of a neutralizing agent (20% aqueous sodium hydroxide) was added thereto to neutralize a salt-forming group. Further, 18 parts by weight of an azo pigment [C.I. Pigment Yellow 74] was added thereto, and the resulting mixture was kneaded with a triple roller-mill for 1 hour.

The same procedures as in Preparation Example 3 were carried out except that the resulting aqueous dispersion of pigment particles was used in place of the aqueous dispersion of the vinyl polymer particles containing a pigment used in Preparation Example 3, to give a water-based ink.

Preparation Example 5

Six parts by weight of a polymer obtained by drying the polymer solution obtained in Preparation Example 1 under reduced pressure was dissolved in 45 parts by weight of methyl ethyl ketone. A given amount of a neutralizing agent (20% aqueous sodium hydroxide) was added thereto to neutralize a salt-forming group. Further, 18 parts by weight of a copper phthalocyanine pigment [C.I. Pigment Blue 15:4] was added thereto, and the resulting mixture was kneaded with a triple roller-mill for 1 hour.

The same procedures as in Preparation Example 3 were carried out except that the resulting aqueous dispersion of pigment particles was used in place of the aqueous dispersion of the vinyl polymer particles containing a pigment used in Preparation Example 3, to give a water-based ink.

Preparation Example 6

Six parts by weight of a polymer obtained by drying the polymer solution obtained in Preparation Example 2 under reduced pressure was dissolved in 45 parts by weight of methyl ethyl ketone. A given amount of a neutralizing agent (50% aqueous gluconic acid solution) was added thereto to neutralize a salt-forming group. Further, 18 parts by weight of a quinacridone pigment [C.I. Pigment Red 122] was added thereto, and the resulting mixture was kneaded with a triple roller-mill for 1 hour.

The same procedures as in Preparation Example 3 were carried out except that the resulting aqueous dispersion of pigment particles was used in place of the aqueous dispersion of the vinyl polymer particles containing a pigment used in Preparation Example 3, to give a water-based ink the pH of which was 4.8 at 20° C.

Preparation Example 7

Six parts by weight of a polymer obtained by drying the polymer solution obtained in Preparation Example 2 under reduced pressure was dissolved in 45 parts by weight of methyl ethyl ketone. A given amount of a neutralizing agent (50% aqueous gluconic acid solution) was added thereto to neutralize a salt-forming group. Further, 18 parts by weight of an azo pigment [C.I. Pigment Yellow 74] was added thereto, and the resulting mixture was kneaded with a triple roller-mill for 1 hour.

The same procedures as in Preparation Example 3 were carried out except that the resulting aqueous dispersion of pigment particles was used in place of the aqueous dispersion of the vinyl polymer particles containing a pigment used in Preparation Example 3, to give a water-based ink.

Preparation Example 8

Six parts by weight of a polymer obtained by drying the polymer solution obtained in Preparation Example 2 under reduced pressure was dissolved in 45 parts by weight of methyl ethyl ketone. A given amount of a neutralizing agent (50% aqueous gluconic acid solution) was added thereto to neutralize a salt-forming group. Further, 18 parts by weight of a copper phthalocyanine pigment [C.I. Pigment Blue 15:4] was added thereto, and the resulting mixture was kneaded with a triple roller-mill for 1 hour.

The same procedures as in Preparation Example 3 were carried out except that the resulting aqueous dispersion of pigment particles was used in place of the aqueous dispersion of the vinyl polymer particles containing a pigment used in Preparation Example 3, to give a water-based ink.

TABLE 2

| Prep. Ex. No. | Kind of Polymer | Degree of Neutralization (%) | Kind of Pigment (C.I. No.) | Solid Content of Aqueous Dispersion (% by wt.) | Composition (% by weight) | | | |
|---|---|---|---|---|---|---|---|---|
| | | | | | Glycerol | 2-Pyrrolidone | Isopropyl Alcohol | Ion-Exchanged Water |
| 3 | Prep. Ex. 1 | 100 | PR 122 | 8.0 | 10.0 | 5.0 | 2.0 | 75.0 |

TABLE 2-continued

| Prep. Ex. No. | Kind of Polymer | Degree of Neutralization (%) | Kind of Pigment (C.I. No.) | Solid Content of Aqueous Dispersion (% by wt.) | Composition (% by weight) | | | |
|---|---|---|---|---|---|---|---|---|
| | | | | | Glycerol | 2-Pyrrolidone | Isopropyl Alcohol | Ion-Exchanged Water |
| 4 | Prep. Ex. 1 | 100 | PY 74 | 8.0 | 10.0 | 5.0 | 2.0 | 75.0 |
| 5 | Prep. Ex. 1 | 100 | PC 15:4 | 8.0 | 10.0 | 5.0 | 2.0 | 75.0 |
| 6 | Prep. Ex. 2 | 100 | PR 122 | 8.0 | 10.0 | 5.0 | 2.0 | 75.0 |
| 7 | Prep. Ex. 2 | 100 | PY 74 | 8.0 | 10.0 | 5.0 | 2.0 | 75.0 |
| 8 | Prep. Ex. 2 | 100 | PC 15:4 | 8.0 | 10.0 | 5.0 | 2.0 | 75.0 |

(Note)
PR: Pigment Red
PY: Pigment Yellow
PC: Pigment Blue

Example 1

The water-based ink obtained in Preparation Example 3 and the water-based ink obtained in Preparation Example 6 were combined together, to give an ink set.

Examples 2 to 9

The same procedures as in Example 1 were carried out except that the water-based inks usable for the color ink were changed to each of those obtained in Preparation Examples shown in Table 3, or a commercially available ink the details of which are shown in Table 6, to give each of ink sets.

Comparative Examples 1 to 12

The same procedures as in Example 1 were carried out except that the water-based inks usable for the color ink were changed to each of those shown in Tables 3 and 4, to give each of ink sets.

In Comparative Examples, as the anionic dye ink and the cationic dye ink, each of those obtained in Preparation Examples shown in Table 4, or a commercially available ink the details of which are shown in Table 6 were used.

The properties of the ink sets obtained in each of Examples and Comparative Examples were evaluated in accordance with the following methods. The results are shown in Tables 3 to 5.

(1) Optical Density

Solid image printing [printing conditions: kind of paper: plain paper, mode setting: fast] was carried out on a commercially available copy paper (high-grade plain paper commercially available from EPSON under the trade name of KA4250NT) using a commercially available inkjet printer (commercially available from EPSON, under the model number of EM-900C), and the printed image was allowed to stand at 25° C. for 1 hour. Thereafter, its optical density was determined by using a Macbeth densitometer (commercially available from Macbeth Process Measurements Co. under the Product Number of RD914), and evaluated on the basis of the following evaluation criteria. The inks were set in a first head and a second head, and printouts were obtained by simultaneously jetting the inks from both first and second heads.

[Evaluation Criteria]
⊚: Optical density of at least 1.20
○: Optical density of at least 1.10 and less than 1.20
Δ: Optical density of at least 1.00 and less than 1.10
x: Optical density of less than 1.00

(2) Light-Fastness

The printed image by the solid image printing for which the optical density was determined as mentioned above was irradiated for 10000 counts consecutively using a xenon Fade-O-meter (commercially available from ATLAS, trade name). Thereafter, the optical density of the same printed portion as that before irradiation was determined again by using the Macbeth densitometer RD914. The residual ratio of the optical density after irradiation to the optical density before irradiation was determined by the equation:

[Residual Ratio]=[(Optical Density after Irradiation)/(Optical Density before Irradiation)]×100

The light-fastness was evaluated on the basis of the following evaluation criteria.

[Evaluation Criteria]
⊚: Residual ratio being at least 95%
○: Residual ratio being at least 80% and less than 95%
Δ: Residual ratio being at least 60% and less than 80%
x: Residual ratio being less than 60%

(3) Water Resistance

Solid image printing was carried out on the above-mentioned commercially available copy paper using the above-mentioned printer, and the printed image was dried at 25° C. for 1 hour. The optical density of the specified printed portion of the obtained sample was determined, and thereafter the printed copy paper was immersed vertically in stand-still water for 10 seconds, and the paper was lifted vertically therefrom. After air-drying the paper at 25° C. for 24 hours, the optical density of the same printing portion as that before immersion was determined. The residual ratio of the optical density after immersion to the optical density before immersion was determined by the following equation:

[Residual Ratio]=[(Optical Density after Immersion)/(Optical Density before Immersion)]×100

The water resistance was evaluated on the basis of the following evaluation criteria.

[Evaluation Criteria]
⊚: Residual ratio being at least 95%
○: Residual ratio being at least 80% and less than 95%
Δ: Residual ratio being at least 60% and less than 80%
x: Residual ratio being less than 60%

(4) Color Reproducible Range

Color reproducible range was determined by measuring the reflected light of a solid image printout of which optical density as determined above at a wave length of light of D65/2° using NIPPON DENSHOKU Spectro Color Meter SE 2000 (commercially available from Nippon Denshoku Kogyo K.K., trade name). The distance of the color coordinates a* and b* from the origin was calculated by the equation:

$$Cab^* = \{(a^*)^2 + (b^*)^2\}^{1/2},$$

and color reproducibility was evaluated on the basis of the following evaluation criteria.

[Evaluation Criteria]

⊚: Color reproducibility being at least 105% to Cab* of anionic dye×anionic dye for each color ○: Color reproducibility being at least 95% and less than 105% to Cab* of anionic dye×anionic dye for each color Δ: Color reproducibility being at least 85% and less than 95% to Cab* of anionic dye×anionic dye for each color x: Color reproducibility being less than 85% to Cab* of anionic dye×anionic dye for each color

TABLE 3

| Ex. No. | First Head | Second Head | Optical Density | Light Fastness | Water Resistance | Color Reproducible Range |
|---|---|---|---|---|---|---|
| 1 | Prep. Ex. 3 | Prep. Ex. 6 | ⊚ | ⊚ | ⊚ | ○ |
| 2 | Prep. Ex. 4 | Prep. Ex. 7 | ⊚ | ⊚ | ⊚ | ⊚ |
| 3 | Prep. Ex. 5 | Prep. Ex. 8 | ⊚ | ⊚ | ⊚ | ○ |
| 4 | Prep. Ex. 3 | Cation M | ⊚ | ○ | ○ | ○ |
| 5 | Prep. Ex. 4 | Cation Y | ⊚ | ○ | ○ | ⊚ |
| 6 | Prep. Ex. 5 | Cation C | ⊚ | ○ | ○ | ○ |
| 7 | Prep. Ex. 6 | Anion M | ⊚ | ○ | ○ | ○ |
| 8 | Prep. Ex. 7 | Anion Y | ⊚ | ○ | ○ | ⊚ |
| 9 | Prep. Ex. 8 | Anion C | ⊚ | ○ | ○ | ○ |

TABLE 4

| Comp. Ex. No. | First Head | Second Head | Optical Density | Light Fastness | Water Resistance | Color Reproducible Range |
|---|---|---|---|---|---|---|
| 1 | Prep. Ex. 3 | Prep. Ex. 3 | Δ | ⊚ | ⊚ | Δ |
| 2 | Prep. Ex. 4 | Prep. Ex. 4 | ○ | ⊚ | ⊚ | Δ |
| 3 | Prep. Ex. 5 | Prep. Ex. 5 | Δ | ⊚ | ⊚ | ○ |
| 4 | Prep. Ex. 6 | Prep. Ex. 6 | X | ⊚ | ⊚ | X |
| 5 | Prep. Ex. 7 | Prep. Ex. 7 | Δ | ⊚ | ⊚ | Δ |
| 6 | Prep. Ex. 8 | Prep. Ex. 8 | X | ⊚ | ⊚ | Δ |

TABLE 5

| Comp. Ex. No. | First Head | Second Head | Optical Density | Light Fastness | Water Resistance | Color Reproducible Range |
|---|---|---|---|---|---|---|
| 7 | Anion M | Anion M | ○ | Δ | X | ○ |
| 8 | Anion Y | Anion Y | ○ | Δ | X | ○ |
| 9 | Anion C | Anion C | ○ | Δ | X | ○ |
| 10 | Cation M | Cation M | Δ | Δ | X | Δ |
| 11 | Cation Y | Cation Y | ○ | Δ | X | ○ |
| 12 | Cation C | Cation C | ⊚ | Δ | X | ○ |

TABLE 6

| | Manufacturer | Product Name | pH |
|---|---|---|---|
| Anion M | EPSON | EM-900C | 9.0 |
| Anion C | EPSON | EM-900C | 8.8 |
| Anion Y | EPSON | EM-900C | 8.5 |
| Cation M | Hewlett-Packard | Business ink jet 2250 | 3.9 |
| Cation C | Hewlett-Packard | Business ink jet 2250 | 4.0 |
| Cation Y | Hewlett-Packard | Business ink jet 2250 | 4.0 |

It can be seen from the results shown in Tables 3 to 5 that all of the ink sets obtained in Examples have high optical densities on plain copy paper and wide color reproducible range. In addition, the ink sets obtained in Examples give printouts excellent in water resistance and light fastness.

The ink set of the present invention exhibits, for instance, an effect of giving printouts with high optical density and wide color reproducible range. Since the ink set of the present invention is also excellent in, for instance, water resistance and light fastness, the ink set can be suitably used as an ink set for inkjet recording.

What is claimed is:

1. An ink set comprising at least one anionic chromatic colored ink other than black ink or white ink and at least one cationic chromatic colored ink other than black ink or white ink, wherein the anionic chromatic colored ink and the cationic chromatic colored ink have the same color, and at least one of the anionic chromatic colored ink and the cationic chromatic colored ink contains a pigment.

2. The ink set according to claim 1, wherein the chromatic colored ink is at least one member selected from the group consisting of magenta ink, cyan ink and yellow ink.

3. The ink set according to claim 1, further comprising a black ink.

4. The ink set according to claim 3, wherein the black ink comprises an anionic colored ink, a cationic colored ink or a mixture thereof.

5. The ink set according to claim 1, wherein the anionic chromatic colored ink is a colored ink containing an anionic polymer or anionic surfactant, a colored ink containing a self-dispersible pigment having an anionic group on its surface, or a colored ink containing a dye having an anionic group.

6. The ink set according to claim 1, wherein the cationic chromatic colored ink is a colored ink containing a cationic polymer or cationic surfactant, a colored ink containing a self-dispersible pigment having a cationic group on its surface, or a colored ink containing a dye having a cationic group.

7. The ink set according to claim 1, wherein the anionic chromatic colored ink is an ink comprising an anionic polymer and a pigment.

8. The ink set according to claim 1, wherein the cationic chromatic colored ink is an ink comprising a cationic polymer and a pigment.

9. A process for recording comprising printing with an ink set of claim 1.

* * * * *